United States Patent
Chavan et al.

(10) Patent No.: US 12,233,359 B2
(45) Date of Patent: Feb. 25, 2025

(54) FILTER CARTRIDGE WITH VALVE ACTIVATION FEATURE

(71) Applicant: Cummins Filtration IP, Inc., Columbus, IN (US)

(72) Inventors: Priti Vishwas Chavan, Pune (IN); Jeff A. Bowerman, Cookeville, TN (US); Anil Ishwar Sawant, Pune (IN); Balasaheb Mahadev Bhittam, Kolhapur (IN); Ismail C. Bagci, Cookeville, TN (US)

(73) Assignee: Cummins Filtration IP, Inc., Columbus, IN (US)

( * ) Notice: Subject to any disclaimer, the term of this patent is extended or adjusted under 35 U.S.C. 154(b) by 482 days.

(21) Appl. No.: 17/575,125

(22) Filed: Jan. 13, 2022

(65) Prior Publication Data
US 2022/0134263 A1    May 5, 2022

Related U.S. Application Data

(63) Continuation of application No. PCT/US2020/041774, filed on Jul. 13, 2020.
(Continued)

(51) Int. Cl.
*B01D 29/21* (2006.01)
*B01D 35/15* (2006.01)
(Continued)

(52) U.S. Cl.
CPC .......... *B01D 29/21* (2013.01); *B01D 35/153* (2013.01); *B01D 35/30* (2013.01);
(Continued)

(58) Field of Classification Search
CPC ...... B01D 29/21; B01D 35/153; B01D 35/30; B01D 2201/0415; B01D 2201/295;
(Continued)

(56) References Cited

U.S. PATENT DOCUMENTS 3,216,572 A * 11/1965 Kasten .................. B01D 29/52
                                                      210/488
3,363,762 A    1/1968 Ensign
(Continued)

FOREIGN PATENT DOCUMENTS

CN      101854996 A    10/2010
CN      102483016 A * 5/2012 ........... B01D 27/106
(Continued)

OTHER PUBLICATIONS

English Translation of Burgan et al Patent Publication CN 102483016A, published May 2012. (Year: 2012).*
(Continued)

*Primary Examiner* — Joseph W Drodge
(74) *Attorney, Agent, or Firm* — Foley & Lardner LLP (57) ABSTRACT

A filter assembly includes a housing defining unfiltered and filtered cavities, a coolant inlet, and a coolant outlet. The filter assembly further includes a stop valve movable between a stop valve closed position and a stop valve open position and an anti-drain valve movable between an anti-drain valve closed position and an anti-drain valve open position. The coolant inlet is in fluid communication with the unfiltered cavity when the stop valve body is in the stop valve open position. The coolant outlet is in fluid communication with the filtered cavity when the anti-drain valve body is in the anti-drain valve open position. A filter cartridge includes a bottom endplate having a rib with a rib end face engaging with the stop valve to move the stop valve body from the stop valve closed position to the stop valve open position when the filter cartridge is positioned within the housing.

20 Claims, 6 Drawing Sheets

Related U.S. Application Data (60) Provisional application No. 62/874,604, filed on Jul. 16, 2019.

(51) Int. Cl.
  B01D 35/153 (2006.01)
  B01D 35/30 (2006.01)

(52) U.S. Cl.
  CPC ............... *B01D 2201/0415* (2013.01); *B01D 2201/295* (2013.01); *B01D 2201/305* (2013.01)

(58) Field of Classification Search
  CPC ........ B01D 2201/305; B01D 2201/291; B01D 2201/347; B01D 2201/4046; B01D 29/88; B01D 29/90; B01D 29/92; B01D 35/157; B01D 35/1573; B01D 2201/16; B01D 2201/296; B01D 2201/302; F01P 11/06; F01P 11/12; F01P 2011/061
  See application file for complete search history.

(56) References Cited

U.S. PATENT DOCUMENTS

| | | | | |
|---|---|---|---|---|
| 5,753,116 | A * | 5/1998 | Baumann | B01D 27/06 210/209 |
| 6,171,482 | B1 * | 1/2001 | Nichols | B01D 35/153 210/232 |
| 8,636,902 | B2 | 1/2014 | Jungmann et al. | |
| 8,691,090 | B2 | 4/2014 | Schachtrup et al. | |
| 8,858,793 | B2 | 10/2014 | Roesgen | |
| 2004/0256308 | A1 * | 12/2004 | Yates | B01D 35/153 210/416.1 |
| 2008/0053884 | A1 | 3/2008 | Marshall et al. | |
| 2008/0190832 | A1 * | 8/2008 | Schachtrup | B01D 35/153 210/234 |
| 2008/0283463 | A1 * | 11/2008 | Hawkins | B01D 35/147 210/441 |
| 2009/0065447 | A1 * | 3/2009 | Forrest | B01D 35/16 210/418 |
| 2010/0101993 | A1 * | 4/2010 | Wells | B01D 36/006 210/455 |
| 2010/0108590 | A1 * | 5/2010 | Curt | B01D 29/96 210/232 |
| 2011/0024344 | A1 * | 2/2011 | Thomas | B01D 29/21 210/232 |
| 2016/0258397 | A1 * | 9/2016 | Jiang | F02M 37/24 |
| 2016/0271533 | A1 | 9/2016 | Honermann et al. | |
| 2016/0332098 | A1 * | 11/2016 | Chavan | B01D 35/143 |

FOREIGN PATENT DOCUMENTS

| | | |
|---|---|---|
| DE | 10200800692 | 7/2009 |
| DE | 102010020727 | 11/2011 |
| GB | 2 208 068 | 2/1989 |
| WO | WO-2006/005331 A1 | 1/2006 |
| WO | WO-2013/002606 A2 | 1/2013 |

OTHER PUBLICATIONS

Extended Search Report in European Patent Application No. 20840058.0 issued Jul. 19, 2023.
International Search Report and Written Opinion issued for PCT Application No. PCT/US2020/041774 issued Oct. 7, 2020, 9 pages.
First Office Action issued for Chinese Patent Application No. 202080050579.6, issued Oct. 9, 2022, 7 pages.

* cited by examiner

FILTER CARTRIDGE WITH VALVE ACTIVATION FEATURE

CROSS REFERENCE TO RELATED APPLICATIONS

The present disclosure is continuation of PCT Application No. PCT/US2020/041774 filed Jul. 13, 2020, which claims priority to U.S. Provisional Application No. 62/874,604, filed Jul. 16, 2019. The contents of these applications are incorporated herein by reference in their entirety and for all purposes.

TECHNICAL FIELD

This disclosure relates to filter cartridges for use in filtering fluids such as coolant.

BACKGROUND

Various types of engines use coolants to regulate the temperature of the engine. Using a filter assembly to filter coolant used with an engine can prolong the life of the coolant. However, without controlling the coolant circulating through the filter, the use of such a filter may pose some safety risks to an operator attempting to service the filter. In operation, for example, the coolant being filtered may be at relatively high temperatures and pressures. Therefore, changing a filter cartridge used to filter the coolant may expose the operator to high temperatures and/or pressures.

SUMMARY

One embodiment relates to a filter assembly. The filter assembly includes a housing having a vessel and a cover coupled together and defining an unfiltered cavity, a filtered cavity, a coolant inlet, and a coolant outlet. The filter assembly further includes a stop valve including a stop valve body configured to move between a stop valve closed position and a stop valve open position. The stop valve body is biased toward the stop valve closed position by a stop valve biasing member. The coolant inlet is in fluid communication with the unfiltered cavity when the stop valve body is in the stop valve open position. The filter assembly further includes an anti-drain valve including an anti-drain valve body configured to move between an anti-drain valve closed position and an anti-drain valve open position. The anti-drain valve body is biased toward the anti-drain valve closed position by an anti-drain valve biasing member. The coolant outlet is in fluid communication with the filtered cavity when the anti-drain valve body is in the anti-drain valve open position. The filter assembly further includes a filter cartridge positionable within the housing. The filter cartridge includes a filter media configured to filter a fluid, a top endplate, and a bottom endplate comprising a rib having a rib end face engaging with the stop valve to move the stop valve body from the stop valve closed position to the stop valve open position when the filter cartridge is positioned within the housing.

One embodiment relates to a filter housing. The filter housing includes a vessel and a cover. The vessel defines a cavity and includes a coolant inlet, a coolant outlet, a stop valve, and an anti-drain valve. The stop valve includes a stop valve body positionable between a stop valve closed position and a stop valve open position. When the stop valve is in the stop valve closed position, the stop valve body forms a first seal between the coolant inlet and the cavity. When the stop valve is in the stop valve open position, the coolant inlet is in fluid communication with the cavity. The anti-drain valve includes an anti-drain valve body positionable between an anti-drain valve closed position and an anti-drain valve open position. When the anti-drain valve is in the anti-drain valve closed position, the anti-drain valve body forms a second seal between the coolant outlet and the cavity. When the anti-drain valve is in the anti-drain valve open position, the coolant outlet is in fluid communication with the cavity. The cover is configured to be coupled to the vessel. The cover further includes a sealing member configured to interface with the vessel and form a sealing relationship with the vessel.

One embodiment relates to a filter cartridge. The filter cartridge includes a filter media, a bottom endplate, a top endplate, and a center portion. The filter media has a first media end, a second media end opposite the first media end, and a filtered cavity extending between the first media end and the second media end. The bottom endplate is coupled to the filter media proximate to the first media end. The bottom endplate includes a rib extending orthogonally away from the bottom endplate in a direction generally away from the filter media. The bottom endplate also includes an outlet conduit in fluid communication with the filtered cavity. The top endplate is coupled to the second media end of the filter media. The top endplate is a closed endcap that seals the filtered cavity proximate to the second media end. The center portion is positioned within the filtered cavity and extends along a longitudinal axis. The center portion extends between the top endplate and the bottom endplate. The center portion further includes a center tube extending along the longitudinal axis.

These and other features, together with the organization and manner of operation thereof, will become apparent from the following detailed description when taken in conjunction with the accompanying drawings, wherein like elements have like numerals throughout the several drawings described below.

DETAILED DESCRIPTION

Referring to the figures generally, a filter assembly is shown. The filter assembly includes a filter cartridge and a filter housing having a coolant inlet and a coolant outlet. The filter assembly includes a stop valve structured to open and close the coolant inlet and an anti-drain valve structured to open and close the coolant outlet. Both the stop valve and the anti-drain valve move between a closed position, where the valve body is sealed against the valve seat, and an open position, where the valve body is unseated from the valve seat. Both the stop valve and the anti-drain valve are biased to the closed position by a biasing member, such as a spring. To move from the closed position to the open position, the stop valve is acted upon by an end face of a rib formed on the bottom endplate of the filter cartridge, releasing the valve body from the valve seat and allowing fluid to flow past the valve body. To move from the closed position to the open position, the anti-drain valve is acted upon by an end face of a center tube of the filter cartridge, releasing the valve body from the valve seat and allowing fluid to flow past the valve body.

Figure 1:
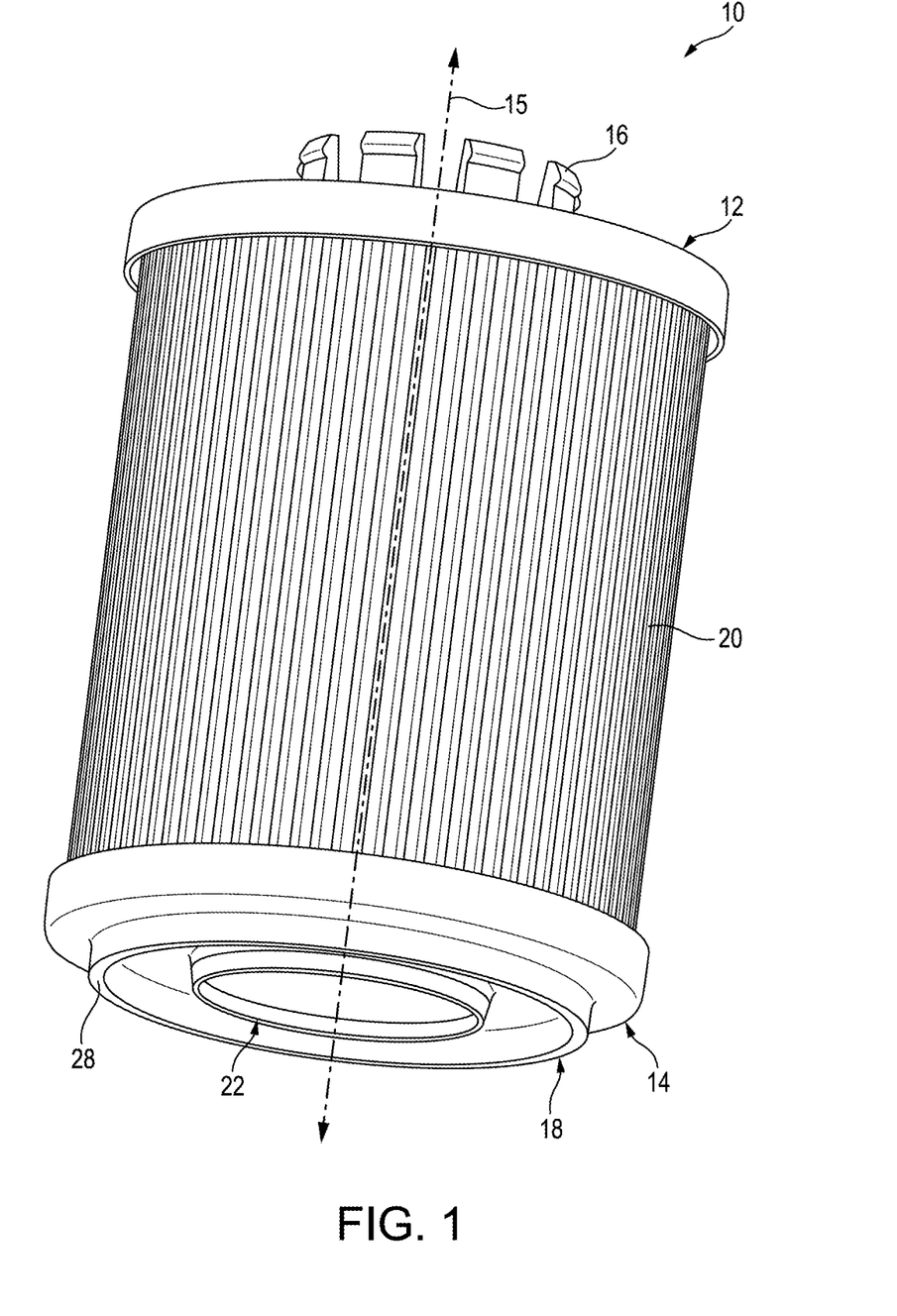
FIG. 1 shows a perspective view of a filter cartridge according to an exemplary embodiment.
Figure 2:
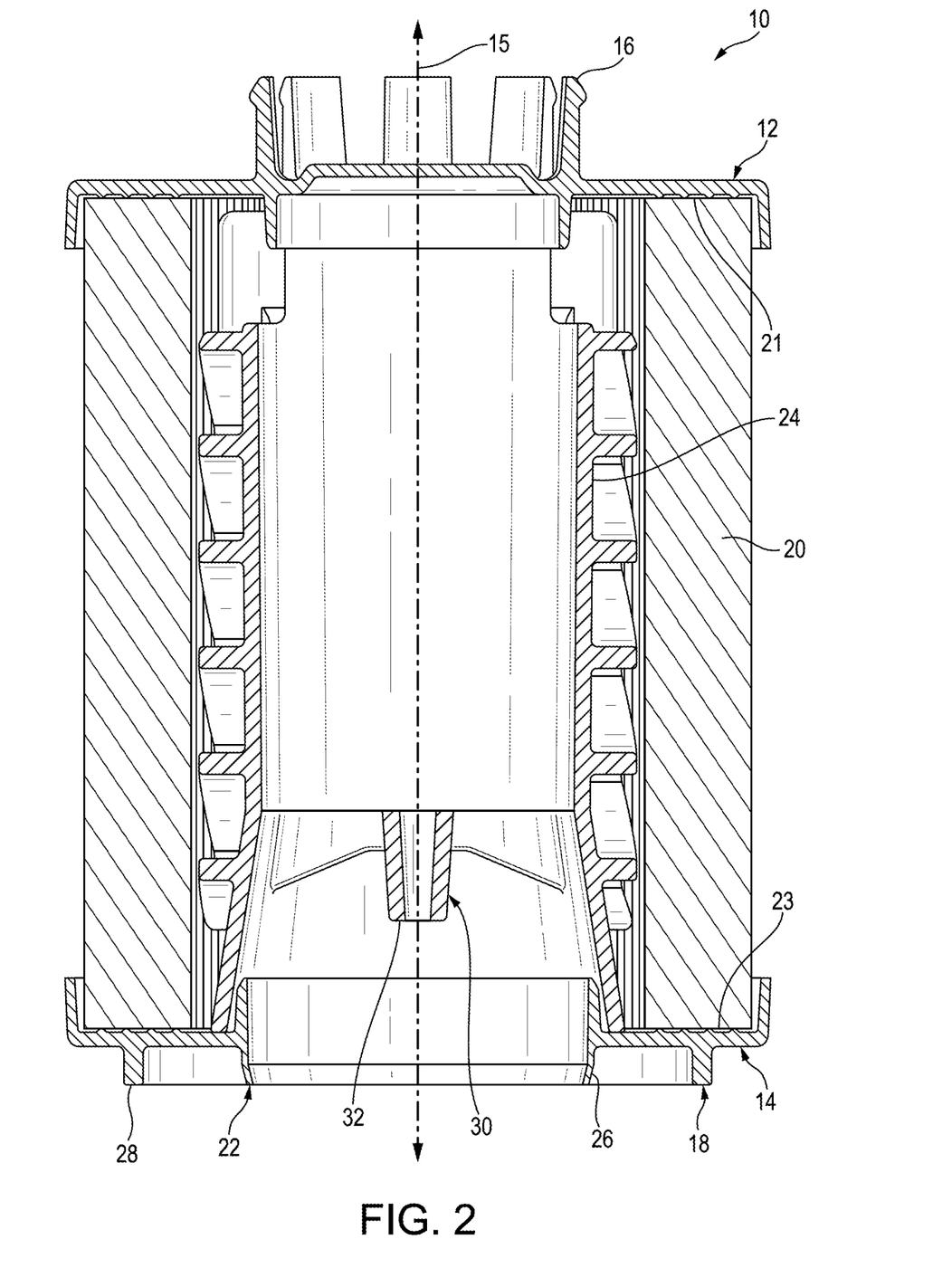
FIG. 2 shows a section view of the filter cartridge of FIG. 1.

Referring to FIGS. 1 and 2, a filter cartridge 10 is shown. The filter cartridge 10 includes a filter media 20 arranged in a cylindrical manner and positioned between a top endplate 12 and a bottom endplate 14. The filter media 20 extends longitudinally along a longitudinal axis 15 between the top endplate 12 and the bottom endplate 14. The filter cartridge 10 includes a center portion 24 and a center tube 30 extending longitudinally along the longitudinal axis 15. The filter media 20 is positioned around the center portion 24.

The top endplate 12 is attached to a first end 21 of the filter media 20 using any suitable attachment method, for example using an adhesive or embedding or potting the first end 21 into the top endplate 12, which can be made of plastic or metal. The top endplate 12 is a closed endcap that seals the dirty side of the filter media 20 (the side of the filter media 20 facing the housing wall) from the clean side of the filter media 20 (the side of the filter media 20 facing the center portion 24). The top endplate 12 includes a plurality of prongs 16 (e.g., snaps) structured to engage with protrusions 55 on the cover 52 of the filter housing 45, as described further herein. The bottom endplate 14 is attached to a second end 23 of the filter media 20 using any suitable attachment method, for example using an adhesive or embedding or potting the second end 23 into the bottom endplate 14, which can be made of plastic or metal.

Figure 3:
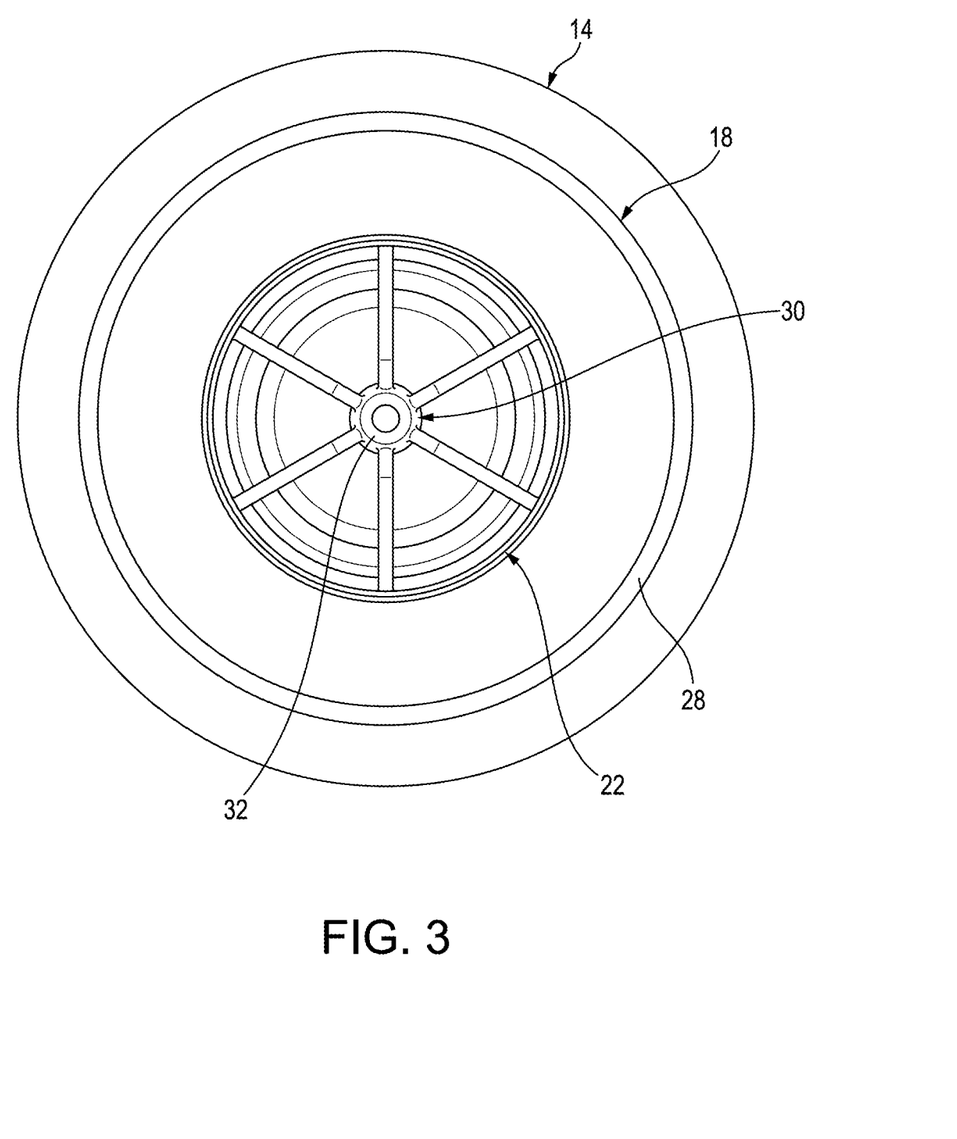
FIG. 3 shows a bottom view of the filter cartridge of FIG. 1.
Figure 4:
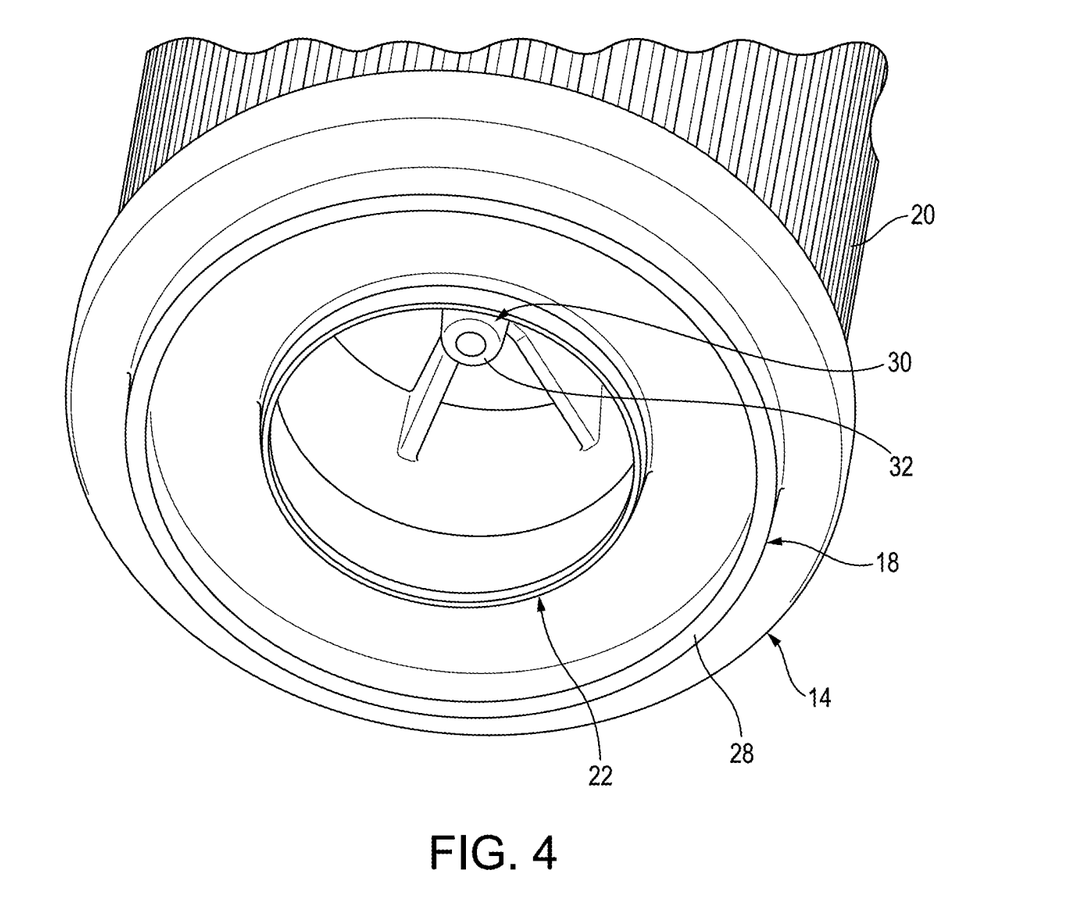
FIG. 4 shows a bottom perspective view of the filter cartridge of FIG. 1.

Referring to FIGS. 2-4, the bottom endplate 14 includes a rib 18 formed on an end face thereof and is positioned around the longitudinal axis 15. The rib 18 is circular in shape and is concentric with the shape of the bottom endplate 14. The rib 18 extends orthogonally away from the bottom endplate 14 in a direction generally away from the filter media 20. The rib 18 includes a rib end face 28 which, as described further herein, is structured to engage a stop valve 72 and a fixture 60 included with the vessel 54 of the filter housing 45. The rib end face 28 is a flat surface substantially parallel with the end face of the bottom endplate 14. The center portion 24 of the filter cartridge 10 includes a center tube 30 extending longitudinally along the longitudinal axis 15 and toward the bottom endplate 14. The center tube 30 includes a center tube end face 32 structured to engage an anti-drain valve 82 included with the filter housing 45, as described further herein. In some embodiments, the center tube 30 is positioned entirely within the filtered cavity of the filter cartridge 10 such that no portion of the center tube 30 extends out of the filtered cavity and beyond the bottom endplate 14. The center tube end face 32 is a flat surface substantially parallel with the end face of the bottom endplate 14. The bottom endplate 14 also includes an outlet conduit 22 formed therein and having a tapered portion 26. The tapered portion 26 tapers inward toward the longitudinal axis 15 as the outlet conduit 22 extends downward and away from the bottom endplate 14. In other words, the tapered portion 26 reduces a cross-sectional area of the outlet conduit 22 as the outlet conduit extends away from the bottom endplate 14 in a direction generally away from the top endplate 12.

Figure 5:
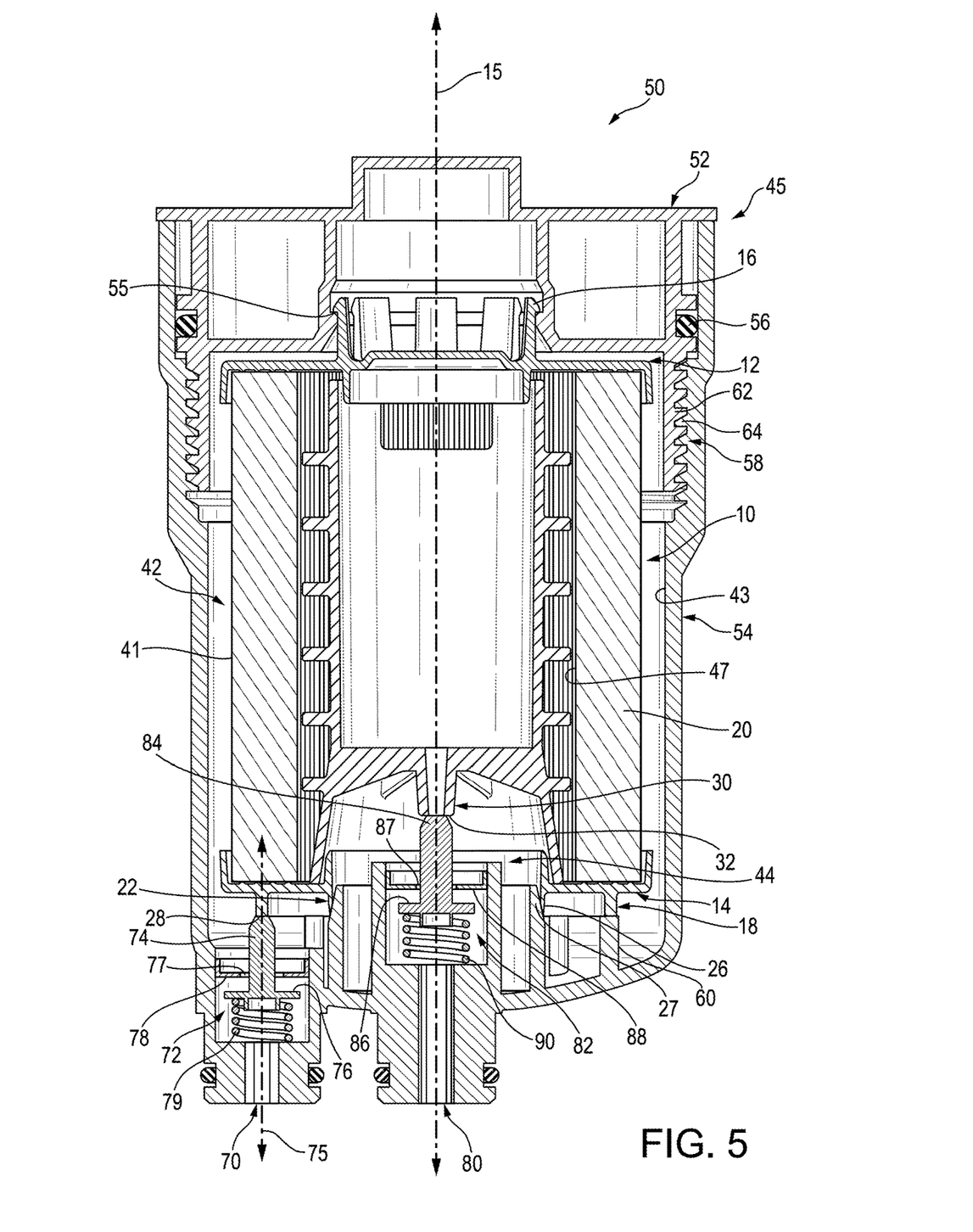
FIG. 5 shows a section view of a filter assembly in an installed and valve-open position according to an exemplary embodiment.
Figure 6:
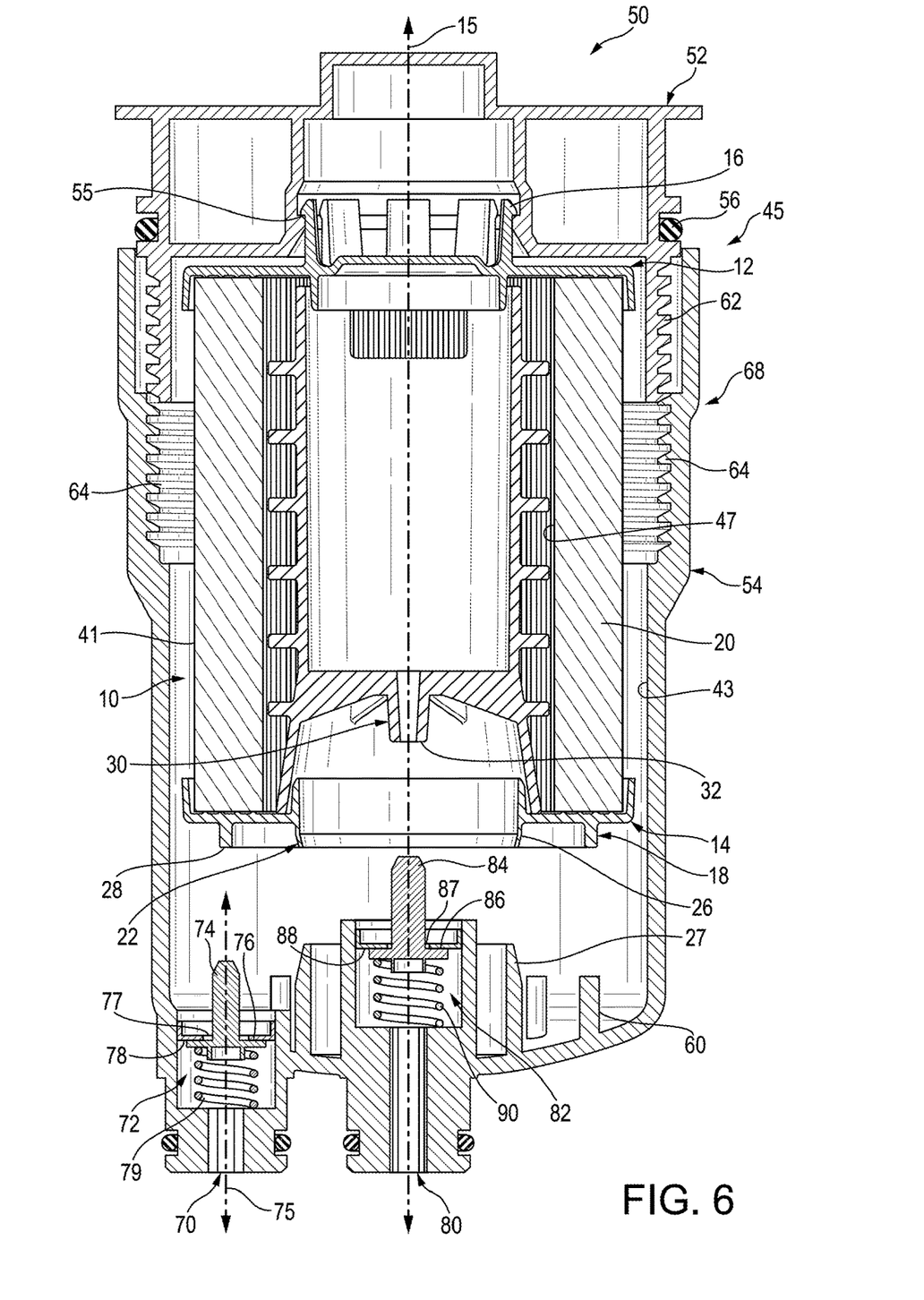
FIG. 6 shows a section view of a filter assembly in an uninstalled and valve-closed position according to an exemplary embodiment.

Referring to FIGS. 5 and 6, a filter assembly 50 is shown. The filter assembly 50 includes a filter housing 45 having a vessel 54 and a cover 52. The vessel 54 includes an internal thread 64 and the cover 52 includes an external thread 62 that can be screwed onto the internal thread 64 of the vessel 54 so as to close the filter assembly 50. In FIG. 5, the filter assembly 50 is shown in a closed position 58, with the internal thread 64 of the vessel 54 and the external thread 62 of the cover 52 engaged with each other. In FIG. 6, the filter assembly 50 is shown in an open position 68, with the internal thread 64 of the vessel 54 and the external thread 62 of the cover 52 disengaged from each other. A sealing member 56 is provided between the vessel 54 and cover 52 to provide sealing of the filter assembly 50. The cover 52 can be unscrewed from the vessel 54 to extract the filter cartridge 10, along with the cover 52 as a single piece, and replace the filter cartridge 10 with a new filter cartridge.

As shown in FIG. 5, the filter housing 45 is divided into an unfiltered cavity 42 and a filtered cavity 44. The unfiltered cavity 42 is defined by the outer wall 41 of the filter media 20 and the inner wall 43 of the vessel 54. The filtered cavity 44 is defined by the inner wall 47 of the filter media and the underside of the top endplate 12. In an installed position (shown in FIG. 5) of the filter cartridge 10 within the filter housing 45, the tapered portion 26 of the outlet conduit 22 of the bottom endplate 14 engages and seals with the outer surface of a tube 27 on the vessel 54. The seal created between the tapered portion 26 and the tube 27 of the vessel 54 seals the unfiltered cavity 42 from the filtered cavity 44 of the filter housing 45. As such, no other seal is necessary between the clean and dirty side of the filter media 20 other than the seal between the bottom endplate 14 and the vessel 54 of the filter housing 45.

The vessel 54 includes a stop valve 72 and an anti-drain valve 82. In the absence of the filter cartridge 10, the stop valve 72 and the anti-drain valve 82 are closed to prevent the flow of fluid respectively therethrough. In addition, the use of a non-compliant filter cartridge may prevent the opening of the stop valve 72 and the anti-drain valve 82, thereby prohibiting the use of a non-compliant filter cartridge with the filter housing 45. With the correct filter cartridge 10 installed into the filter housing 45, the stop valve 72 and anti-drain valve 82 are opened allowing fluid to flow into the coolant inlet 70, through the filter cartridge 10, and drained from the filter housing 45 through the coolant outlet 80.

The stop valve 72 includes a stop valve body 74 and a stop valve seat 78. The stop valve body 74 includes a stop valve body surface 76 which seats against the stop valve seat 78 in a stop valve closed position. The stop valve 72 is structured to move between the stop valve closed position (shown in FIG. 6) and a stop valve open position (shown in FIG. 5). In the stop valve closed position, the stop valve body 74 is sealed against the stop valve seat 78 and closes off the stop valve opening 77. In the stop valve open position, the stop valve body 74 is unseated from the stop valve seat 78, thereby opening stop valve opening 77 and allowing the passage of fluid past the stop valve seat 78 through the stop valve opening 77. The stop valve 72 is biased to the stop valve closed position by a biasing member 79 (e.g., a spring). The stop valve body 74 translates along a longitudinal axis 75 between the stop valve open position and the stop valve closed position. The longitudinal axis 75 is substantially parallel to and offset from the longitudinal axis 15 of the filter cartridge 10. In the stop valve open position of the stop valve 72, the coolant inlet 70 is open and in the closed position of the stop valve 72, the coolant inlet 70 is closed. In the stop valve open position of the stop valve 72, the coolant inlet 70 is in fluid communication with the unfiltered cavity 42 and in the stop valve closed position, the coolant inlet 70 is not in fluid communication with the unfiltered cavity 42.

The stop valve 72 is acted upon by the flat surface of the rib end face 28 of the bottom endplate 14 of the filter cartridge 10 when the filter cartridge 10 is inserted longitudinally into the vessel 54 of the filter housing 45. As the filter cartridge 10 is inserted into the filter housing 45, the rib end face 28 contacts and engages with the stop valve body 74, overcoming the opposing force of the biasing member 79, and unseating the stop valve body 74 from the stop valve seat 78. Accordingly, in an installed position of the filter cartridge 10 within the filter housing 45, the stop valve 72 is in the stop valve open position. In an uninstalled position of the filter cartridge 10 from the filter housing 45, the stop valve 72 is in the stop valve closed position, preventing the flow of incoming coolant into the filter housing 45 through the coolant inlet 70. The rib 18 (e.g., rib end face 28) thus acts as a hard stop for the stop valve body 74 (at inlet) to open the coolant inlet 70 to the filter housing 45.

The vessel 54 may further include a fixture 60 configured to engage the rib end face 28 of the bottom endplate 14 of the filter cartridge 10 when the filter cartridge 10 is inserted longitudinally into the vessel 54 of the filter housing 45. The fixture 60 extends away from an end of the vessel 54 opposite the cover 52 and the fixture 60 extends in a direction generally toward the cover 52. The fixture 60 facilitates positioning of the filter cartridge 10 within the vessel 54 such that the stop valve body 74 is engaged and the stop valve 72 is in the stop valve open position. As will be appreciated from FIGS. 5 and 6, over-engagement of the stop valve body 74 by a filter cartridge (e.g., unauthorized filter cartridge) may cause a portion of the stop valve body 74 to extend into the coolant inlet 70, placing the stop valve 72 in the stop valve closed position and preventing the flow of incoming coolant into the filter housing 45.

As shown in FIG. 6, the stop valve body 74 extends beyond (e.g., extends further into the vessel 54 than) the fixture 60 when the stop valve 72 is in the stop valve closed position. As shown in FIG. 5, the fixture 60 acts as a hard stop for the filter cartridge 10, the fixture 60 facilitating the engagement between the rib 18 and the stop valve body 74 such that the stop valve body 74 is even with the fixture 60 when the filter cartridge 10 is inserted into the vessel 54 and the stop valve 72 is in the stop valve open position. The fixture 60 may be circular in shape and may be concentric about the longitudinal axis 15. In some embodiments, the fixture 60 is formed of a plurality of projections concentric about the longitudinal axis 15.

The anti-drain valve 82 includes an anti-drain valve body 84 and an anti-drain valve seat 88. The anti-drain valve body 84 includes an anti-drain valve body surface 86 which seats against the anti-drain valve seat 88 in an anti-drain valve closed position. The anti-drain valve 82 is structured to move between the anti-drain valve closed position (shown in FIG. 6) and an anti-drain valve open position (shown in FIG. 5). In the anti-drain valve closed position, the anti-drain valve body 84 is sealed against the anti-drain valve seat 88 and closes off the anti-drain valve opening 87. In the anti-drain valve open position, the anti-drain valve body 84 is unseated from the anti-drain valve seat 88 thereby opening anti-drain valve opening 87 and allowing the passage of fluid past the anti-drain valve seat 88 through the anti-drain valve opening 87. The anti-drain valve 82 is biased to the anti-drain valve closed position by a biasing member 90 (e.g., a spring). The anti-drain valve body 84 translates along the longitudinal axis 15 of the filter cartridge 10 between the anti-drain valve open position and the anti-drain valve closed position. In the anti-drain valve open position of the anti-drain valve 82, the coolant outlet 80 is open and in the anti-drain valve closed position of the anti-drain valve 82, the coolant outlet 80 is closed. In the anti-drain valve open position of the anti-drain valve 82, the coolant outlet 80 is in fluid communication with the filtered cavity 44 and in the anti-drain valve closed position, the coolant outlet 80 is not in fluid communication with the filtered cavity 44.

The anti-drain valve 82 is acted upon by the center tube end face 32 of the center tube 30 of the filter cartridge 10 when the filter cartridge is inserted longitudinally into the vessel 54 of the filter housing 45. In some embodiments, the anti-drain valve 82 is acted upon by the center tube end face 32 of the center tube 30 of the filter cartridge 10 when the rib end face 28 interfaces with the fixture 60 of the vessel 54. As the filter cartridge 10 is inserted into the filter housing 45, the center tube end face 32 contacts and engages with the anti-drain valve body 84, overcoming the opposing force of the biasing member 90, and unseating the anti-drain valve body 84 from the anti-drain valve seat 88. In some embodiments, the fixture 60 facilitates positioning of the bottom endplate 14 and thus facilitates positioning of the center tube 30. Thus, when the rib 18 interfaces with the fixture 60, the center tube 30 may interface with the anti-drain valve body 84 and bias the anti-drain valve body surface 86 away from the anti-drain valve seat 88, thus positioning the anti-drain valve 82 in the anti-drain valve open position. Accordingly, in an installed position of the filter cartridge 10 within the filter housing 45, the anti-drain valve 82 is in the anti-drain valve open position. In an uninstalled position of the filter cartridge 10 from the filter housing 45, the anti-drain valve 82 is in the anti-drain valve closed position, preventing the draining of coolant from the filter housing 45 through the coolant outlet 80. The center tube 30 (e.g., center tube end face 32) thus acts as a hard stop for the anti-drain valve 82 to open the coolant outlet to an engine with which the filter assembly 50 is used. As will be appreciated from FIGS. 5 and 6, the anti-drain valve 82, similar to the stop valve 72, can be overset (e.g., such as by an unauthorized, non-compliant, or incorrect filter cartridge) such that a portion of the anti-drain valve 82 extends into the coolant outlet 80 and prevents a flow of coolant through the coolant outlet 80.

In some embodiments, when the filter cartridge 10 is inserted into the vessel 54, the stop valve 72 and anti-drain valve 82 are opened simultaneously. That is, the rib end face 28 is engaged with the stop valve body 74 and the center tube end face 32 is engaged with the anti-drain valve body 84 at the same time (e.g., at least for some portion of time). In other embodiments, the opening of the stop valve 72 does not occur at the same time that the anti-drain valve 82 is opened and, instead, the opening of each valve is staggered in time. In other words, the stop valve 72 may be operable between the stop valve open position and the stop valve closed position independent of position of the anti-drain valve 82.

Still referring to FIGS. 5 and 6, the top endplate 12 includes a plurality of prongs 16 (e.g., snaps) structured to engage with protrusions 55 on the cover 52 of the filter housing 45. Accordingly, the filter cartridge 10 is removed along with the cover 52 as a single piece when the cover 52 is decoupled and removed from the vessel 54 of the filter housing 45. After unscrewing the cover 52, the filter cartridge 10 is removed substantially longitudinally from the vessel 54.

It should be noted that any use of the term "example" herein to describe various embodiments is intended to indicate that such embodiments are possible examples, representations, and/or illustrations of possible embodiments (and such term is not intended to connote that such embodiments are necessarily extraordinary or superlative examples).

As utilized herein, the term "substantially" and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed (e.g., within plus or minus five percent of a given angle or other value) are considered to be within the scope of the invention as recited in the appended claims. The term "approximately" when used with respect to values means plus or minus five percent of the associated value.

The terms "coupled" and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

References herein to the positions of elements (e.g., "top," "bottom," "above," "below," etc.) are merely used to describe the orientation of various elements in the figures. It should be noted that the orientation of various elements may differ according to other example embodiments, and that such variations are intended to be encompassed by the present disclosure.

It is important to note that the construction and arrangement of the various example embodiments are illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. For example, elements shown as integrally formed may be constructed of multiple parts or elements, the position of elements may be reversed or otherwise varied, and the nature or number of discrete elements or positions may be altered or varied. The order or sequence of any process or method steps may be varied or re-sequenced according to alternative embodiments. Additionally, features from particular embodiments may be combined with features from other embodiments as would be understood by one of ordinary skill in the art. Other substitutions, modifications, changes and omissions may also be made in the design, operating conditions and arrangement of the various example embodiments without departing from the scope of the present invention.

What is claimed is:

1. A filter assembly comprising:
    a housing comprising a vessel and a cover coupled together, the housing defining an unfiltered cavity, a filtered cavity, an inlet, and an outlet;
    a stop valve comprising a stop valve body configured to move between a stop valve closed position and a stop valve open position, the stop valve body biased toward the stop valve closed position by a stop valve biasing member, the inlet in fluid communication with the unfiltered cavity when the stop valve body is in the stop valve open position;
    an anti-drain valve comprising an anti-drain valve body configured to move between an anti-drain valve closed position and an anti-drain valve open position, the anti-drain valve body biased toward the anti-drain valve closed position by an anti-drain valve biasing member, the outlet in fluid communication with the filtered cavity when the anti-drain valve body is in the anti-drain valve open position; and
    a filter cartridge positionable within the housing, the filter cartridge comprising:
    a filter media configured to filter a fluid;
    a top endplate; and
    a bottom endplate comprising a rib having a rib end face engaging with the stop valve to move the stop valve body from the stop valve closed position to the stop valve open position when the filter cartridge is positioned within the housing, the rib defining a hard stop for the stop valve body in the stop valve open position, the stop valve body being configured and arranged such that a portion of the stop valve body extends into the inlet if the filter cartridge over-engages the stop valve body and moves the stop valve body to the stop valve closed position when the stop valve body moves beyond the hard stop.

2. The filter assembly of claim 1, wherein the stop valve body is in the stop valve closed position and the anti-drain valve body is in the anti-drain valve closed position in an uninstalled position of the filter cartridge.

3. The filter assembly of claim 1, wherein the top endplate comprises a plurality of prongs and the cover comprises a plurality of protrusions, the plurality of prongs engaged with the plurality of protrusions such that the cover and the filter cartridge are removable from the housing as a single piece.

4. The filter assembly of claim 1, further comprising a tapered portion formed on the bottom endplate, the tapered portion sealing against the vessel in an installed position of the filter cartridge to seal the unfiltered cavity from the filtered cavity.

5. The filter assembly of claim 1, wherein the vessel further comprises a fixture extending away from the vessel and configured to engage with the filter cartridge when the filter cartridge is positioned within the vessel, wherein the stop valve body extends further into the unfiltered cavity than the fixture when the stop valve is in the stop valve closed position.

6. The filter assembly of claim 1, wherein the top endplate is a closed endcap and separates the unfiltered cavity from the filtered cavity.

7. A filter assembly comprising:
    a housing comprising a vessel and a cover coupled together, the housing defining an unfiltered cavity, a filtered cavity, an inlet, and an outlet;
    a stop valve comprising a stop valve body configured to move between a stop valve closed position and a stop valve open position, the stop valve body biased toward the stop valve closed position by a stop valve biasing member, the inlet in fluid communication with the unfiltered cavity when the stop valve body is in the stop valve open position;
  an anti-drain valve comprising an anti-drain valve body configured to move between an anti-drain valve closed position and an anti-drain valve open position, the anti-drain valve body biased toward the anti-drain valve closed position by an anti-drain valve biasing member, the outlet in fluid communication with the filtered cavity when the anti-drain valve body is in the anti-drain valve open position;
  a filter cartridge positionable within the housing, the filter cartridge comprising:
    a filter media configured to filter a fluid:
    a top endplate: and
    a bottom endplate comprising a rib having a rib end face engaging with the stop valve to move the stop valve body from the stop valve closed position to the stop valve open position when the filter cartridge is positioned within the housing; and
  a center tube having a center tube end face engaging with the anti-drain valve to move the anti-drain valve body from the anti-drain valve closed position to the anti-drain valve open position when the filter cartridge is positioned within the housing.

8. The filter assembly of claim 2, wherein the rib end face does not engage the stop valve and the center tube end face does not engage the anti-drain valve in an uninstalled position of the filter cartridge.

9. A filter housing comprising:
  a vessel defining a cavity, the vessel comprising:
    a coolant inlet;
    a coolant outlet;
    a stop valve comprising a stop valve body positionable between a stop valve closed position and a stop valve open position, the stop valve body forming a first seal between the coolant inlet and the cavity in the stop valve closed position, a portion of the stop valve body configured to extend into the coolant inlet when the stop valve is in the stop valve closed position, and the coolant inlet in fluid communication with the cavity when the stop valve body is in the stop valve open position; and
    an anti-drain valve comprising:
      an anti-drain valve body positionable between an anti-drain valve closed position and an anti-drain valve open position, the anti-drain valve body forming a second seal between the coolant outlet and the cavity in the anti-drain valve closed position, and the coolant outlet being in fluid communication with the cavity when the anti-drain valve body is in the anti-drain valve open position; and
      an anti-drain valve biasing member configured to bias the anti-drain valve body into the anti-drain valve closed position; and
  a cover configured to be coupled to the vessel, the cover comprising a sealing member configured to interface with the vessel and form a sealing relationship with the vessel.

10. The filter housing of claim 9, further comprising:
  a stop valve biasing member configured to bias the stop valve body into the stop valve closed position.

11. The filter housing of claim 9, wherein the stop valve is configured to be positionable between the stop valve closed position and the stop valve open position independent of the position of the anti-drain valve.

12. The filter housing of claim 9, wherein the vessel further comprises internal threads and the cover further comprises external threads, the internal threads configured to be coupled to the external threads, and the sealing member configured to form the sealing relationship between the cover and the vessel when the internal threads are coupled to the external threads.

13. The filter housing of claim 9, wherein the vessel further comprises a first vessel end and a second vessel end opposite to the first vessel end, the first vessel end configured to receive the cover, and the second vessel end comprising the coolant outlet and the coolant inlet.

14. The filter housing of claim 9, further comprising a fixture extending into the cavity, wherein the stop valve body extends further into the cavity than the fixture when the stop valve is in the stop valve closed position.

15. A filtration structure including a cartridge, the cartridge comprising:
  a filter media having a first media end, a second media end opposite the first media end, and a filtered cavity extending between the first media end and the second media end;
  the filtration structure further including a stop valve configured to move between a closed position preventing flow into the filter media and an open position enabling flow into the filter media;
  wherein the cartridge further comprises a bottom endplate coupled to the first media end, the bottom endplate comprising:
    a rib extending orthogonally away from the bottom endplate in a direction generally away from the filter media, the rib defining a hard stop for the stop valve open position; and
  an outlet conduit in fluid communication with the filtered cavity; and
  a top endplate coupled to the second media end, the top endplate being a closed endcap that seals the filtered cavity proximate to the second media end;
  the filtration structure further including an anti-drain valve configured to move between a closed position preventing flow through the outlet conduit and an open position enabling flow through the outlet conduit; and
  wherein a center portion is positioned within the filtered cavity, the center portion extending along a longitudinal axis, the center portion extending between the top endplate and the bottom endplate, the center portion comprising a center tube positioned within the center portion and extending along the longitudinal axis, the center tube defining a hard stop for the anti-drain valve open position.

16. The filter structure of claim 15, wherein the center tube is positioned entirely within the filtered cavity.

17. The filter structure of claim 15, wherein the top endplate further comprises a plurality of projections extending away from the top endplate in a direction generally away from the filter media.

18. The filter structure of claim 15, wherein the rib forms a generally annular ring concentric about the longitudinal axis.

19. The filter structure of claim 15, wherein the outlet conduit further comprises a tapered portion extending away from the bottom endplate in a direction generally away from the top endplate, the tapered portion reducing a cross-sectional area of the outlet conduit as the outlet conduit extends away from the bottom endplate.

20. The filter structure of claim 15, wherein the outlet conduit extends into the center portion and into the filtered cavity.

\* \* \* \* \*